United States Patent
Trelin et al.

(10) Patent No.: US 10,521,652 B1
(45) Date of Patent: Dec. 31, 2019

(54) ENHANCING CAPABILITIES BY COOPERATIVELY USING IDENTITY SYSTEMS AND IDENTIFICATION DATABASES

(71) Applicant: Alclear, LLC, New York, NY (US)

(72) Inventors: Joe Trelin, New York, NY (US); Matthew Snyder, New York, NY (US); Rob Wisniewski, New York, NY (US)

(73) Assignee: ALCLEAR, LLC, New York, NY (US)

( * ) Notice: Subject to any disclaimer, the term of this patent is extended or adjusted under 35 U.S.C. 154(b) by 0 days.

(21) Appl. No.: 16/394,725

(22) Filed: Apr. 25, 2019

(51) Int. Cl.
*G06K 9/00* (2006.01)
*G06F 9/54* (2006.01)
*G06F 21/32* (2013.01)

(52) U.S. Cl.
CPC ......... *G06K 9/00362* (2013.01); *G06F 9/542* (2013.01); *G06F 21/32* (2013.01)

(58) Field of Classification Search
CPC ..... G06F 21/32; G06F 21/34; G06K 9/00926; G07C 9/00087; H04L 9/3231
USPC .............. 382/115, 116; 340/5.83, 5.82, 5.52; 705/44, 78, 64, 65, 67; 704/246, 270.1, 704/273; 726/26; 235/382
See application file for complete search history.

(56) References Cited

U.S. PATENT DOCUMENTS

| | | | |
|---|---|---|---|
| 6,879,966 B1 * | 4/2005 | Lapsley | G01F 19/005 235/380 |
| 8,381,969 B1 | 2/2013 | Miller et al. | |
| 8,423,462 B1 | 4/2013 | Amacker et al. | |
| 8,521,131 B1 | 8/2013 | Ramalingam et al. | |
| 8,659,390 B2 * | 2/2014 | Rickman | G06K 9/00892 340/5.82 |
| 8,744,966 B1 | 6/2014 | Amacker et al. | |
| 9,107,064 B1 | 8/2015 | Ramalingam et al. | |
| 9,166,961 B1 | 10/2015 | Johansson et al. | |
| 9,202,105 B1 | 12/2015 | Wang et al. | |
| 9,324,098 B1 | 4/2016 | Agrawal et al. | |
| 9,386,507 B1 | 7/2016 | Ramalingam et al. | |
| 9,607,138 B1 | 3/2017 | Baldwin et al. | |
| 9,609,577 B1 | 3/2017 | Ramalingam et al. | |
| 9,681,350 B1 | 6/2017 | Marupaduga et al. | |
| 9,681,359 B2 | 6/2017 | Ramalingam et al. | |
| 9,723,131 B1 | 8/2017 | Ramalingam et al. | |

(Continued)

*Primary Examiner* — Charlotte M Baker
(74) *Attorney, Agent, or Firm* — Brownstein Hyatt Farber Schreck, LLP

(57) ABSTRACT

A system enhances capabilities by cooperatively using identity systems and identification databases. In some examples, a system uses a biometric to verify an identity for a person with an identification database, accesses identity information for the person in an identity system using the biometric, and performs an action using the identity information. In various examples, a system attempts to verify an identity for a person with an identification database using a biometric, attempts to verify the identity for the person with an identity system using the biometric, and performs an action if the identity is verified. In a number of examples, a system obtains a biometric and identity information for a person; uses at least one of the identity information or the biometric to verify an identity for the person; and, upon confirming the identity with an identification database using the biometric, enrolls the person in an identity system.

20 Claims, 13 Drawing Sheets

(56) References Cited

U.S. PATENT DOCUMENTS

| | | |
|---|---|---|
| 9,836,642 B1 | 12/2017 | Ramaswamy |
| 9,934,504 B2 | 4/2018 | Wang et al. |
| 9,967,250 B2 | 5/2018 | Johansson et al. |
| 10,027,662 B1 | 7/2018 | Mutagi et al. |
| 10,055,740 B2 | 8/2018 | Hanson et al. |
| 10,104,181 B1 | 10/2018 | Rao et al. |
| 10,108,791 B1 | 10/2018 | Masterman |
| 10,108,961 B2 | 10/2018 | Wang et al. |
| 10,122,727 B2 | 11/2018 | Johansson et al. |
| 10,235,669 B2 | 3/2019 | Amacker et al. |
| 10,242,364 B2 | 3/2019 | Wang et al. |
| 10,243,945 B1 | 3/2019 | Kruse et al. |
| 2014/0313007 A1* | 10/2014 | Harding ............. G07C 9/00158 340/5.52 |
| 2015/0379516 A1* | 12/2015 | Yingst ................ G06Q 20/4014 705/44 |
| 2018/0007060 A1 | 1/2018 | Leblang et al. |
| 2019/0013931 A1* | 1/2019 | Benini .................... H04L 9/006 |
| 2019/0036939 A1 | 1/2019 | Johansson et al. |
| 2019/0172281 A1* | 6/2019 | Einberg .................. G06K 9/00 |
| 2019/0199717 A1* | 6/2019 | Hoyos ................ H04L 63/0861 |

\* cited by examiner

ENHANCING CAPABILITIES BY COOPERATIVELY USING IDENTITY SYSTEMS AND IDENTIFICATION DATABASES

FIELD

The described embodiments relate generally to identifications, such as biometric identifications. More particularly, the present embodiments relate to enhancing capabilities of identity systems and/or identification databases by cooperatively using the identity systems and identification databases.

BACKGROUND

Use of biometrics (such as one or more fingerprints, vein scans, palm-vein scans, voiceprints, facial images, retina images, iris images, deoxyribonucleic acid sequences, heart rhythms, gaits, and so on) to establish a person's identity is increasingly common. Biometrics may be used to unlock electronic devices, retrieve sensitive information, enter secure areas (such as airport terminals, event venues, and so on), rent or purchase goods and/or services, and so on. A variety of different technologies may be used in a variety of different implementations to establish a person's identity using biometrics.

In some implementations, use of biometrics to establish a person's identity may involve obtaining a biometric from a person and comparing that biometric to biometric data stored in an identification database and/or similar data storage area. If the biometric matches stored biometric data, the person's identity may be established. Otherwise, the person's identity may not be established.

SUMMARY

The present disclosure relates to enhancing capabilities by cooperatively using identity systems and identification databases. In some examples, a system uses a digital representation of a biometric to verify an identity for a person with an identification database, accesses identity information for the person in an identity system using the digital representation of the biometric, and performs an action using the identity information. In various examples, a system attempts to verify an identity for a person with an identification database using a digital representation of a biometric, attempts to verify the identity for the person with an identity system using the digital representation of the biometric, and performs an action if the identity for the person is verified. In a number of examples, a system obtains a digital representation of a biometric and identity information for a person; uses at least one of the identity information or the digital representation of the biometric to verify an identity for the person; and, upon confirming the identity with an identification database using the digital representation of the biometric, enrolls the person in an identity system.

In various embodiments, a system for enhancing capabilities by cooperatively using identity systems and identification databases includes at least one non-transitory storage medium that stores instructions and at least one processor. The at least one processor executes the instructions to obtain at least one digital representation of a biometric for a person, use the at least one digital representation of the biometric to verify an identity for the person with an identification database, access identity information for the person in an identity system using the at least one digital representation of the biometric, and perform an action using the identity information.

In some examples, the action includes estimating a path for the person using the identity information. In various examples, the action includes transmitting a communication to the person using the identity information. In a number of examples, the action includes transmitting a notification regarding the person to a computing device using the identity information.

In various examples, the action includes receiving a query regarding the identity information and responding to the query. In some examples, the action includes using the identity information to reduce a gallery size for a subsequent identification. In various examples, the action includes updating the identity information based on a response from the identification database.

In a number of examples, the action includes updating the identity information based on receipt of the at least one digital representation of the biometric. In some examples, the action includes processing a payment. In various examples, the identity information is not stored in the identification database.

In some embodiments, a system for enhancing capabilities by cooperatively using identity systems and identification databases includes at least one non-transitory storage medium that stores instructions and at least one processor. The at least one processor executes the instructions to obtain at least one digital representation of a biometric for a person, attempt to verify an identity for the person with an identification database using the at least one digital representation of the biometric, attempt to verify the identity for the person with an identity system using the at least one digital representation of the biometric, and perform an action if the identity for the person is verified.

In various examples, the at least one processor performs a first verification by verifying the identity for the person with the identification database and increases a fidelity of the first verification by performing a second verification through verifying the identity for the person with the identity system. In some implementations of such examples, the at least one digital representation of the biometric is a first digital representation of a first biometric and a second digital representation of a second biometric, the first verification uses the first digital representation of the first biometric, and the second verification uses the second digital representation of the second biometric.

In a number of examples, the at least one processor uses information from the identification database to update the identity system when the at least one processor is able to verify the identity for the person with the identification database but is unable to verify the identity for the person with the identity system. In other examples, the at least one processor uses information from the identity system to update the identification database when the at least one processor is able to verify the identity for the person with the identity system but is unable to verify the identity for the person with the identification database. In various examples, first biometric data stored in the identification database is of a lower quality than second biometric data stored by the identity system.

In a number of embodiments, a system for enhancing capabilities by cooperatively using identity systems and identification databases includes at least one non-transitory storage medium that stores instructions and at least one processor. The at least one processor executes the instructions to obtain at least one digital representation of a biometric for a person; obtain identity information for the person; use at least one of the identity information or the at least one digital representation of the biometric to verify an identity for the person; and upon confirming the identity for the person with an identification database using the at least one digital representation of the biometric, enroll the person in an identity system.

In some examples, the at least one processor enrolls the person in the identification system upon verification of an identification token when the identity for the person cannot be confirmed with the identification database. In various examples, the at least one processor stores data regarding at least one of the at least one digital representation of the biometric or the identity information as part of enrolling the person in the identity system. In a number of examples, the at least one processor is operative to use the identity system to biometrically identify the person after enrolling the person in the identity system.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
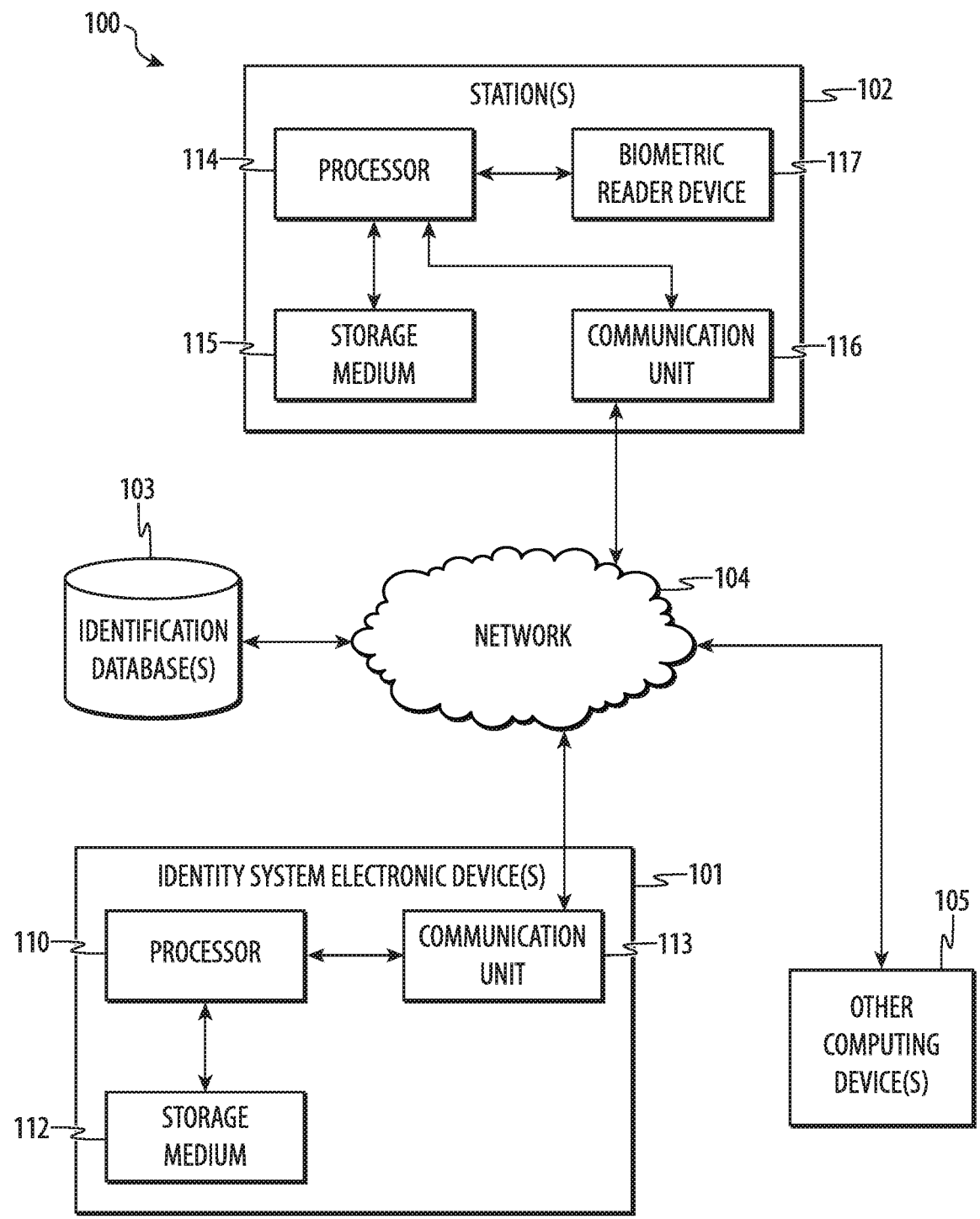
FIG. 1 depicts a first example system for enhancing capabilities by cooperatively using identity systems and identification databases.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

As discussed above, a person's identity may be established by obtaining a digital representation of a biometric from a person and comparing that digital representation of the biometric to biometric data stored in an identification database. Identification databases (including governmental identification databases, public identification databases, private identification databases, proprietary identification databases, and so on) may be primarily configured to establish a person's identity and/or to confirm and/or deny specific authorizations to which the person may and/or may not be entitled. Identification databases may be limited in the kinds of information they store, the time periods for which they store the information, the kinds of queries to which they respond, the kind of information they can return in response to queries, and so on.

For example, a United States Customs and Border protection biometric identification database might store biometric data for people. In some implementations, the stored biometric data may be limited to digital representations of facial images for people who are scheduled to fly through a United States airport within the limited amount of time of a particular day (which may be organized using data accessed using a secure flight database and/or no fly list and/or other database maintained by the Transportation Security Administration and/or other organization). In such implementations, this identification database may be configured to support establishing people's identities for airline check in, airport security, and/or aircraft boarding by performing the limited actions of receiving digital representations of facial images, comparing the digital representations of facial images to the stored digital representations of facial images that are stored for the limited amount of time, and/or responding whether or not people are identified based on whether or not the comparison resulted in a match.

By way of contrast, identity systems may store and/or track a variety of different information related to the identities of various people. This identity information may include, but is not limited to one or more names, addresses, telephone numbers, notification preferences and/or other notification information, social security numbers, frequent flyer numbers, financial data, financial account numbers, verified ages, boarding pass data, flight data, movement data, historic movement data, and so on. The identity system may store and/or track any kind of identity information for any length of time, though the people associated with that information may be able to control the identity information that is stored and for how long. The identity system may support a variety of different queries regarding the identification information. For example, the identity system may be operable to provide any of a different number of attestations regarding the identity data upon request. Such attestations may include establishing an identity, providing requested identity data (such as a name, contact information, associated electronic device identifier, flight and/or other ticket information, payment and/or other financial information, and so on), confirming authorization to enter an area (such as that the person has a valid ticket, boarding pass, and so on), estimated movement, historic movement, whether or not a payment was processed, and so on.

The identity system may control access to the identity information as part of responding to requests and/or providing one or more attestations. The identity system may control access to the identity information using various mechanisms such as through matching of a received hash and/or other digital representation of a biometric with biometric data associated with the identity information, determining that a requestor is authorized to access identity data, and so on.

Thus, identification databases and identity systems may store different information for different amounts of time and/or may be configured with the capability to perform different actions using the information that they respectively store. Even for biometric data, identification databases and identity systems may store biometric data for different sets of people, store different types and/or number of types of biometric data, store different resolutions of biometric data, store biometric data differently, search for biometric data differently, compare received digital representations of biometrics with stored biometric data differently, respond to queries differently, and so on. In short, identification databases and identity systems may be configured differently and have different capabilities.

However, various systems may use the capabilities of identification databases and identity systems by using both identification databases and identity systems. Further, some systems may enhance the capabilities provided by either identification databases or identity systems by cooperatively using identification databases and identity systems. Various configurations are possible and contemplated without departing from the scope of the present disclosure.

The following disclosure relates to enhancing capabilities by cooperatively using identity systems and identification databases. In some examples, a system uses a digital representation of a biometric to verify an identity for a person with an identification database, accesses identity information for the person in an identity system using the digital representation of the biometric, and performs an action using the identity information. In various examples, a system attempts to verify an identity for a person with an identification database using a digital representation of a biometric, attempts to verify the identity for the person with an identity system using the digital representation of the biometric, and performs an action if the identity for the person is verified. In a number of examples, a system obtains a digital representation of a biometric and identity information for a person; uses at least one of the identity information or the digital representation of the biometric to verify an identity for the person; and, upon confirming the identity with an identification database using the digital representation of the biometric, enrolls the person in an identity system.

In this way, the system may be capable of performing functions that would not be possible with only an identity system or an identification database. Additionally, the system is able to operate more efficiently using fewer hardware and/or software components as performance of additional operations using additional components and/or excessive use of existing hardware and/or software components are not necessary in order to accomplish these functions.

These and other embodiments are discussed below with reference to FIGS. 1-9. However, those skilled in the art will readily appreciate that the detailed description given herein with respect to these Figures is for explanatory purposes only and should not be construed as limiting.

FIG. 1 depicts a first example system 100 for enhancing capabilities by cooperatively using identity systems and identification databases. The system 100 may include one or more identity system electronic devices 101 that are operable to communicate with one or more stations 102, identification databases 103, and/or other computing devices 105 via one or more wired and/or wireless communication networks 104. The system 100 may use the identity system electronic device 101 and the identification database 103 to perform a variety of functions that the identity system electronic device 101 and the identification database 103 are not capable of enabling alone.

The identity system electronic device 101 may be operable to obtain a digital representation of a biometric from a person (such as via a biometric reader device 117 of the station 102) and comparing the digital representation of the biometric to biometric data stored by the identification database 103 and/or the identity system electronic device 101. For example, the identity system electronic device 101 may transmit the digital representation of the biometric to the identification database 103 and receive a response (such as an indication that the person's identity is established, information about the established identity such as a name, and so on).

The identification database 103 (which may be a governmental identification database, a public identification database, a private identification database, a proprietary identification database, and so on) may be configured to establish a person's identity and/or to confirm and/or deny specific authorizations to which the person may and/or may not be entitled. The identification database 103 may be limited in the kinds of information the identification database 103 is operable to store, the time periods for which the identification database 103 stores the information, the kinds of queries to which the identification database 103 is operable to respond, the kind of information the identification database 103 can return in response to queries, and so on.

By way of illustration, the identification database 103 may be a United States Customs and Border Protection biometric identification database that may be used to store biometric data for people who may pass through airports, through border areas, and so on. In some implementations, the stored biometric data may be limited to digital representations of facial images for people who are scheduled to fly through a United States airport within the limited amount of time of a particular day. For example, the United States Customs and Border Protection biometric identification database may be populated and/or otherwise organized using data accessed using a secure flight database and/or no fly list and/or other database maintained by the Transportation Security Administration and/or other organization. In such implementations, the United States Customs and Border Protection biometric identification database may be configured to support establishing people's identities for airline check in, airport security, and/or aircraft boarding. The United States Customs and Border Protection biometric identification database may be configured to support this function by being operable to perform the actions of receiving digital representations of facial images, comparing the digital representations of facial images to the stored digital representations of facial images that are stored for the limited amount of time, responding whether or not people are identified based on whether or not the comparison resulted in a match, and so on.

The identity system electronic device 101 may store and/or track a variety of different information related to the identities of various people. This identity information may include, but is not limited to, one or more names, addresses, telephone numbers, notification preferences and/or other notification information, social security numbers, frequent flyer numbers, financial data, financial account numbers, verified ages, boarding pass data, flight data, movement data, historic movement data, and so on. The identity system electronic device 101 may store and/or track any kind of identity information for any length of time, though the identity system electronic device 101 may be operative to enable the people associated with that information to control the identity information that is stored and for how long. The identity system electronic device 101 may support a variety of different queries regarding the identification information. For example, the identity system electronic device 101 may be operable to provide any of a different number of attestations regarding the identity data upon request. Such attestations may include establishing an identity, providing requested identity data (such as a name, contact information, associated electronic device identifier, flight and/or other ticket information, payment and/or other financial information, and so on), confirming authorization to enter an area (such as that the person has a valid ticket, boarding pass, and so on), estimated movement, historic movement, whether or not a payment was processed, and so on.

The identity system electronic device 101 may control access to the identity information as part of responding to requests and/or providing one or more attestations. The identity system electronic device 101 may control access to the identity information using various mechanisms such as through matching of a received hash and/or other digital representation of a biometric with biometric data associated with the identity information, determining that a requestor is authorized to access identity data, receipt of authorized account logins and/or passwords, authorization tokens, and/or other access control mechanisms, and so on.

Thus, the identification database 103 and the identity system electronic device 101 may store different information for different amounts of time and/or may be configured with the capability to perform different actions using the information that they respectively store. Even for biometric data, the identification database 103 and the identity system electronic device 101 may store biometric data for different sets of people, store different types and/or number of types of biometric data, store different resolutions of biometric data, store biometric data differently, search for biometric data differently, compare received digital representations of biometrics with stored biometric data differently, respond to queries differently, and so on. In short, the identification database 103 and the identity system electronic device 101 may be configured differently and have different capabilities.

By including both the identity system electronic device 101 and the identification database 103, the system 100 may be operable to use the capabilities of both the identity system electronic device 101 and the identification database 103. Further, the system 100 may enhance the capabilities provided by either or both of the identity system electronic device 101 and the identification database 103 by cooperatively using both the identity system electronic device 101 and the identification database 103. Various configurations are possible and contemplated without departing from the scope of the present disclosure.

In some implementations, the system 100 (and/or one or more components thereof, such as the identity system electronic device 101) may use the identification database 103 to perform identifications and then link to identity information in the identity system electronic device 101 to perform various actions, such as processing and/or otherwise facilitating payment, tracking people, estimating directions of travel and/or paths for people, control access to restricted areas (such as lounges, airport terminals, sporting venues, and so on), verification of eligibility (such as duty free shopping for international travelers, age-restricted products, and so on), identification token verification and/or validation (such as a driver's license, passport, state or military identification card, and so on), and so on. In various implementations, the system 100 may use the identification database 103 to verify identity (and/or identification token verification and/or validation) as part of enrollment in the identity system electronic device 101. Alternatively, the system 100 may use the identity system electronic device 101 to verify identity (and/or identification token verification and/or validation) as part of enrollment in the identification database 103. In a number of implementations, the system 100 may use the identification database 103 to perform identifications and then use the identity system electronic device 101 to increase the fidelity of the identifications (such as where identification using both increases fidelity of identifications, the identity system electronic device 101 stores higher quality biometric data than the identification database 103 (or the identification database 103 stores lower quality biometric data than the identity system electronic device 101), the identity system electronic device 101 uses one or more different types of biometrics than the identification database 103, and so on). In various implementations, the system 100 may use the identification database 103 to perform identifications and link information stored in the identification database 103 to identity information stored by the identity system electronic device 101 (such as by indicating in the identity information data returned from the identification database 103, data regarding identifications performed using the identification database 103, and so on). In a number of implementations, the system 100 may use the identity information to control biometric and/or other gallery sizes for biometric identifications performed using the identification database 103 and/or the identity system electronic device 101. The system 100 may be operable to respond to queries (such as from the station 102, the other computing device 105, and so on) regarding identity information stored by the identity system electronic device 101, transmit messages (such as to the station 102, the other computing device 105, an electronic device associated with a person corresponding to identity information, and so on) regarding identity information stored by the identity system electronic device 101, and so on. Various configurations are possible and contemplated without departing from the scope of the present disclosure.

In some examples, the system 100 may use a digital representation of a biometric to verify an identity for a person with the identification database 103. The system 100 may then access identity information for the person in the identity system electronic device 101 using the digital representation of the biometric. The system 100 may then perform an action using the identity information. By way of illustration, such an action may include processing a payment, transmitting a message based on the identification, signaling shifting of resources based on an estimated path of the person, tracking of the person, traffic monitoring in a location, transmitting a message (such as directions, maps, flight information, flight updates, and so on) to an electronic device associated with the person, and so on. In some implementations, the identity system electronic device 101 may communicate with the identification database 103 and/or the station 102 in order to accomplish these operations. Various configurations are possible and contemplated without departing from the scope of the present disclosure.

In various examples, the system 100 may attempt to verify an identity for a person with the identification database 103 using a digital representation of a biometric. The system may attempt to verify the identity for the person with the identity system electronic device 101 using the digital representation of the biometric. The system 100 may perform an action if the identity for the person is verified. By way of illustration, the system 100 may use one of the identification database 103 or the identity system electronic device 101 to verify the person's identity as a backup if the other is unable to verify the person's identity (and/or to update information stored by the other and so on). By way of another illustration, the system 100 may use both the identification database 103 and the identity system electronic device 101 to increase the fidelity of identity verification performable by either alone. By way of yet another example, the system 100 may use both the identification database 103 and the identity system electronic device 101 in order to access information associated with the verification stored by either the identification database 103 or the identity system electronic device 101. In some implementations, the identity system electronic device 101 may communicate with the identification database 103 and/or the station 102 in order to accomplish these operations. Various configurations are possible and contemplated without departing from the scope of the present disclosure.

In a number of examples, the system 100 may obtain a digital representation of a biometric and identity information for a person. The system 100 may use at least one of the identity information or the digital representation of the biometric to verify an identity for the person (such as verifying the liveness of the biometric, verifying that the person has a valid identification token, verifying that the person is not on a no fly list and/or other law enforcement warning database, determining the likelihood that a person is who the person asserts to be using accessible public records, knowledge-based authentication questions, and so on). Upon confirming the identity with the identification database 103 using the digital representation of the biometric, the system 100 may enroll the person in the identity system electronic device 101. In some implementations, the identity system electronic device 101 may communicate with the identification database 103 and/or the station 102 in order to accomplish these operations. Various configurations are possible and contemplated without departing from the scope of the present disclosure.

In this way, the system 100 may be capable of performing functions that would not be possible with only the identity system electronic device 101 or the identification database 103. Additionally, the system 100 is able to operate more efficiently using fewer hardware and/or software components as performance of additional operations using additional components and/or excessive use of existing hardware and/or software components are not necessary in order to accomplish these functions.

In various implementations, the station 102 may be operable to provide one or more digital representations of one or more biometrics from one or more people to the identity system electronic device 101 and receive one or more responses from the identity system electronic device 101. The identity system electronic device 101 may use the identity information to provide a variety of different responses to the station and/or one or more other electronic devices, such as the identification database 103, the other computing device 105, and so on. Such responses may identify people, verify asserted identity, verify various information associated with identity (such as whether or not a person has a valid flight and/or other ticket and/or other authorization to be in an area, whether or not the person is at least 21 years old and/or another age, whether or not the person has a verified identity document, and so on), process one or more payments, track one or more rewards and/or loyalty accounts, determine presence of a person in the area, track movement of a person, predict and/or otherwise estimate where a person will go, and so on.

The station 102 may be any kind of electronic device. Examples of such devices include, but are not limited to, one or more desktop computing devices, laptop computing devices, mobile computing devices, wearable devices, tablet computing devices, mobile telephones, smart phones, printers, displays, kiosks, vehicles, kitchen appliances, entertainment system devices, digital media players, and so on. The station 102 may include one or more processors 114 and/or other processing units and/or controllers, one or more non-transitory storage media 115 (which may take the form of, but is not limited to, a magnetic storage medium; optical storage medium; magneto-optical storage medium; read only memory; random access memory; erasable programmable memory; flash memory; and so on), one or more communication units 116, one or more biometric reader devices 117 (such as a fingerprint scanner, a vein scanner, a palm-vein scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and so on), and/or one or more other components, such as one or more input/output components (including, but not limited to, one or more displays, touch screens, printers, microphones, speakers, keyboards, computer mice, track pads, and so on). The processor 114 may execute one or more sets of instructions stored in the non-transitory storage media 115 to perform various functions, such as using the biometric reader device 117 to obtain one or more digital representations of one or more biometrics (such as one or more hashes and/or other digital representations of one or more fingerprints, vein scans, palm-vein scans, voiceprints, facial images, retina images, iris images, deoxyribonucleic acid sequences, heart rhythms, gaits, and so on) for a person, communicate with the identity system electronic device 101 via the network 104 using the communication unit 116, receive identity information and/or attestations from the identity system electronic device 101, query the identity system electronic device 101 regarding identity information, perform one or more actions based on and/or otherwise using information received from the identity system electronic device 101, and so on.

Similarly, the identity system electronic device 101 may be any kind of electronic device and/or cloud and/or other computing arrangement and may include one more processors 110, non-transitory storage media 112, communication units 113, and/or other components. The processor 110 may execute one or more sets of instructions stored in the non-transitory storage medium 112 to perform various functions, such as storing biometric data for people and associated identity information (such as one or more names, addresses, telephone numbers, notification preferences and/or other notification information, social security numbers, frequent flyer numbers, financial data, financial account numbers, verified ages, boarding pass data, flight data, movement data, historic movement data, and so on), receive one or more digital representations of biometrics, transmit one or more received digital representations of biometrics to the identification database 103, receive one or more responses from and/or otherwise communicate with the identification database 103, match one or more received digital representations of biometrics to stored biometric data, retrieve identity information associated with stored biometric data matching one or more received digital representations of biometrics, provide retrieved identity information, communicate with the station 102 and/or the identification database 103 and/or the other computing device 105 (such as one or more governmental or private biometric and/or identity databases, payment processing systems, identity document verification systems such as a passport and/or driver's license verification and/or other identity card system, no fly list databases, law enforcement databases, and so on) via the network 104 using the communication unit 113, and so on.

The identification database 103 may be any kind of public, private, governmental, proprietary, and/or other kind of database that may be used to establish the identity of people. Although the identification database 103 is illustrated and described as a database, it is understood that this is an example. In various implementations, the identification database 103 may be any kind of data store without departing from the scope of the present disclosure.

The other computing device 105 may be any kind of computing device and/or system with which the identity system electronic device 101 may communicate related to identity information and/or identifications. Examples of such other computing devices 105 may include, but are not limited to, one or more payment processing systems, financial systems, airline computing systems, governmental systems, no fly databases, secure flight databases, Transportation Security Administration systems, age verification systems, identification token verification systems, credit card gateways, background check systems, credit account creation systems, biographic information databases, and so on.

Although the system 100 is illustrated and described as including particular components arranged in a particular configuration that perform particular functions, it is understood that this is an example. In various implementations, various arrangements of various components that perform various functions may be implemented without departing from the scope of the present disclosure.

For example, the system 100 is illustrated and described as including the station 102. However, in some examples, the station 102 may be omitted and/or the functions attributed to the station 102 may be performed by the identity system electronic device 101, the identification database 103, the other computing device 105, and so on. Various configurations are possible and contemplated without departing from the scope of the present disclosure.

Figure 2:
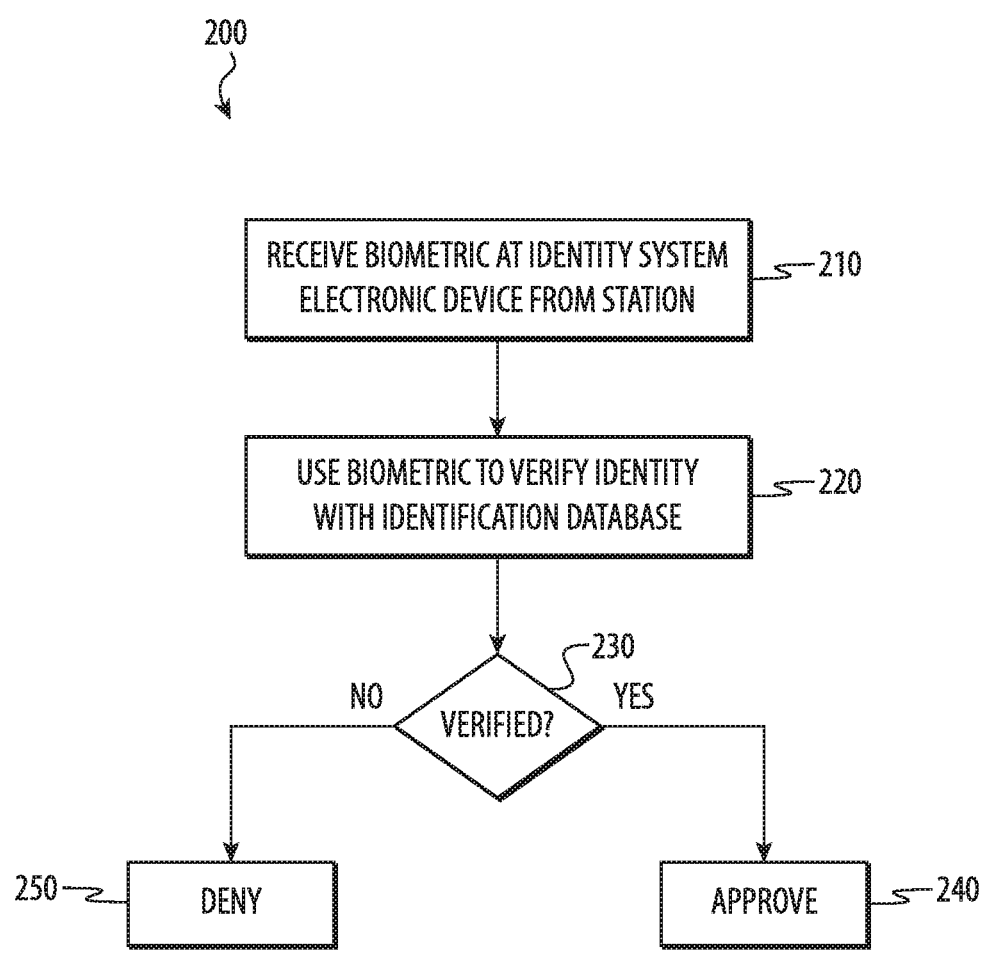
FIG. 2 depicts a flow chart illustrating a first example method for enhancing capabilities by cooperatively using identity systems and identification databases. This method may be performed by the system of FIG. 1.

FIG. 2 depicts a flow chart illustrating a first example method 200 for enhancing capabilities by cooperatively using identity systems and identification databases. This method 200 may be performed by the system 100 of FIG. 1.

At operation 210, an electronic device, such as the identity system electronic device 101 of FIG. 1 and/or the station 102 of FIG. 1, may receive at least one digital representation of at least one biometric. The digital representation of the biometric may be received by an identity system device from a station. The digital representation of the biometric may include one or more hashes and/or other digital representations of one or more fingerprints, vein scans, palm-vein scans, voiceprints, facial images, retina images, iris images, deoxyribonucleic acid sequences, heart rhythms, gaits, and so on obtained using one or more biometric reader devices (such as a fingerprint scanner, a vein scanner, a palm-vein scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and so on).

At operation 220, the electronic device may use the digital representation of the biometric to verify and/or otherwise establish an identity of a person with an identification database. For example, the electronic device may transmit the digital representation of the biometric to the identification database and receive one or more responses. The responses may include a verification that the person is identified, information about the person's identity, and so on.

At operation 230, the electronic device may determine whether or not the identity is verified. If so, the flow may proceed to operation 240 where the electronic device may approve the person. Otherwise, the flow may proceed to operation 250 where the electronic device may deny the person.

For example, the electronic device may be a security screening device at an airport and the identification database may be a United States Customs and Border Protection biometric identification database that stores biometric data for people who have a flight within a period of time (such as two hours, one day, and so on). The electronic device may obtain the digital representation of the biometric from the person, provide the digital representation of the biometric to the United States Customs and Border Protection biometric identification database, and approve or deny the person for security screening using a response from the United States Customs and Border Protection biometric identification database. In some implementations, the electronic device may also be able to access stored identity information for the person (such as using the digital representation of the biometric, the response from the United States Customs and Border Protection biometric identification database, and so on) and perform various actions based on and/or otherwise using the identity information. Various configurations are possible and contemplated without departing from the scope of the present disclosure.

In various examples, this example method 200 may be implemented as a group of interrelated software modules or components that perform various functions discussed herein. These software modules or components may be executed within a cloud network and/or by one or more computing devices, such as the identity system electronic device 101 of FIG. 1 and/or the station 102 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described as verifying the person's identity using the identification database. However, it is understood that this is an example. In some implementations, the electronic device may alternatively and/or additionally access stored identity information for the person (such as via one or more identity systems) in order to verify and/or otherwise establish a person's identity. Various configurations are possible and contemplated without departing from the scope of the present disclosure.

Figure 3:
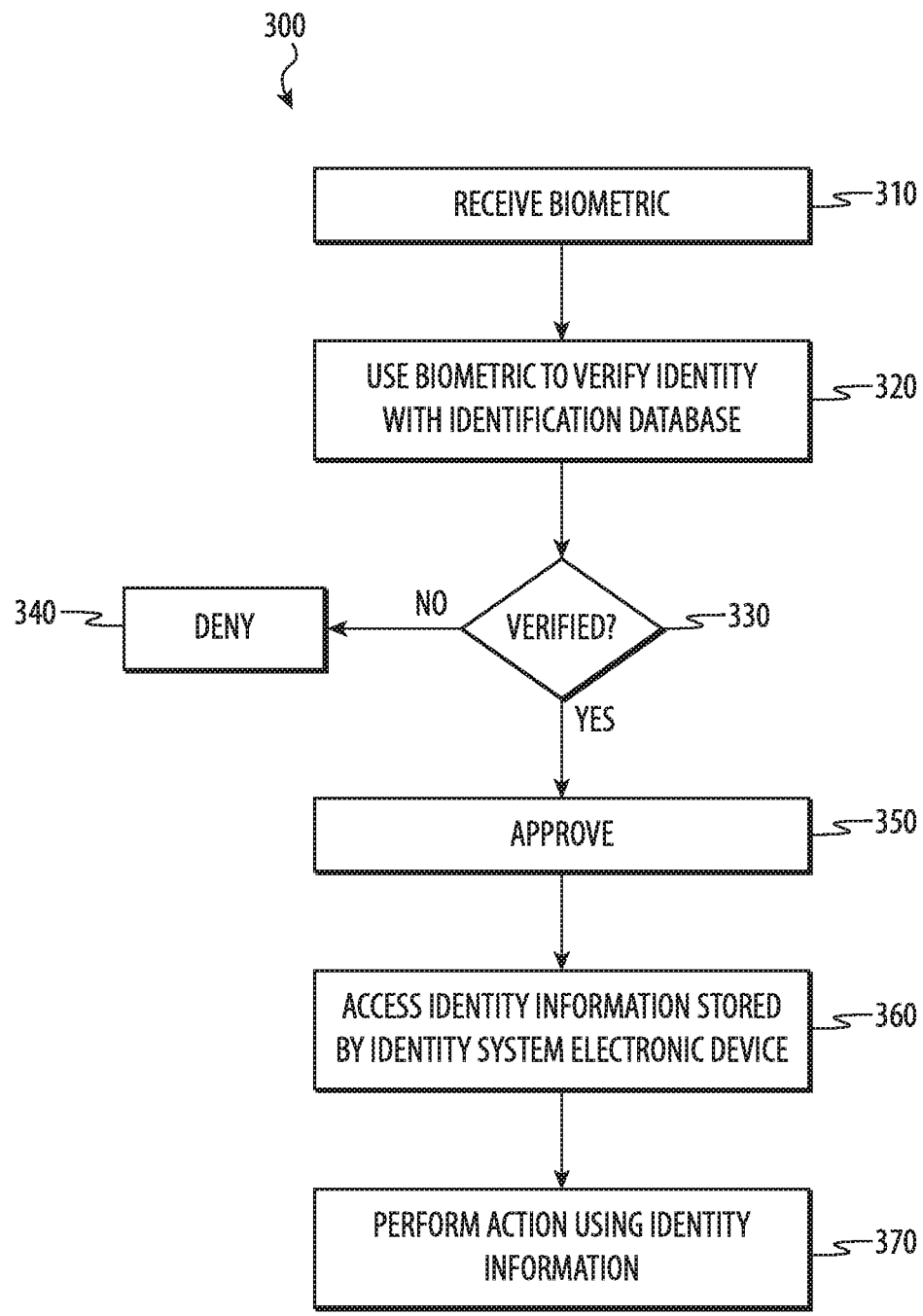
FIG. 3 depicts a flow chart illustrating a second example method for enhancing capabilities by cooperatively using identity systems and identification databases. This method may be performed by the system of FIG. 1.

FIG. 3 depicts a flow chart illustrating a second example method 300 for enhancing capabilities by cooperatively using identity systems and identification databases. This method 300 may be performed by the system 100 of FIG. 1.

At operation 310, an electronic device, such as the identity system electronic device 101 of FIG. 1 and/or the station 102 of FIG. 1, may receive a digital representation of a biometric. At operation 320, the electronic device may use the digital representation of the biometric to verify and/or otherwise establish an identity of a person. For example, the electronic device may use the digital representation of the biometric to verify the identity with an identification database. At operation 330, the electronic device may determine whether or not identity is verified. If so, the flow may proceed to operation 350 where the electronic device may approve the person. For example, the electronic device may allow the person to enter an area. Otherwise, the flow may proceed to operation 340 where the electronic device may deny the person.

At operation 360, after the electronic device approves the person, the electronic device may access identity information stored by an identity system electronic device. The electronic device may access the identity information using the digital representation of the biometric, information provided by the identification database, and so on. At operation 370, the electronic device may perform an action based on and/or otherwise using the identity information.

In various examples, this example method 300 may be implemented as a group of interrelated software modules or components that perform various functions discussed herein. These software modules or components may be executed within a cloud network and/or by one or more computing devices, such as the identity system electronic device 101 of FIG. 1 and/or the station 102 of FIG. 1.

Although the example method 300 is illustrated and described as including particular operations performed in a particular order, it is understood that this is an example. In various implementations, various orders of the same, similar, and/or different operations may be performed without departing from the scope of the present disclosure.

For example, the method 300 is illustrated and described as approving or denying the person according to whether or not the identity was verified. However, it is understood that this is an example. In some implementations, the electronic device may verify the identity, perform one or more actions using accessed identity information, and/or perform other actions without approving or denying the person according to whether or not the identity was verified. Various configurations are possible and contemplated without departing from the scope of the present disclosure.

In various implementations, a system for enhancing capabilities by cooperatively using identity systems and identification databases may include at least one non-transitory storage medium that stores instructions and at least one processor. The at least one processor may execute the instructions to obtain at least one digital representation of a biometric for a person, use the at least one digital representation of the biometric to verify an identity for the person with an identification database, access identity information for the person in an identity system using the at least one digital representation of the biometric, and perform an action using the identity information.

In some examples, the action may include estimating a path for the person using the identity information. In various examples, the action may include transmitting a communication to the person using the identity information. In a number of examples, the action may include transmitting a notification regarding the person to a computing device using the identity information.

In various examples, the action may include receiving a query regarding the identity information and responding to the query. In some examples, the action may include using the identity information to reduce a gallery size for a subsequent identification. In various examples, the action may include updating the identity information based on a response from the identification database.

In a number of examples, the action may include updating the identity information based on receipt of the at least one digital representation of the biometric. In some examples, the action may include processing a payment. In various examples, the identity information is not stored in the identification database.

Figure 4A:
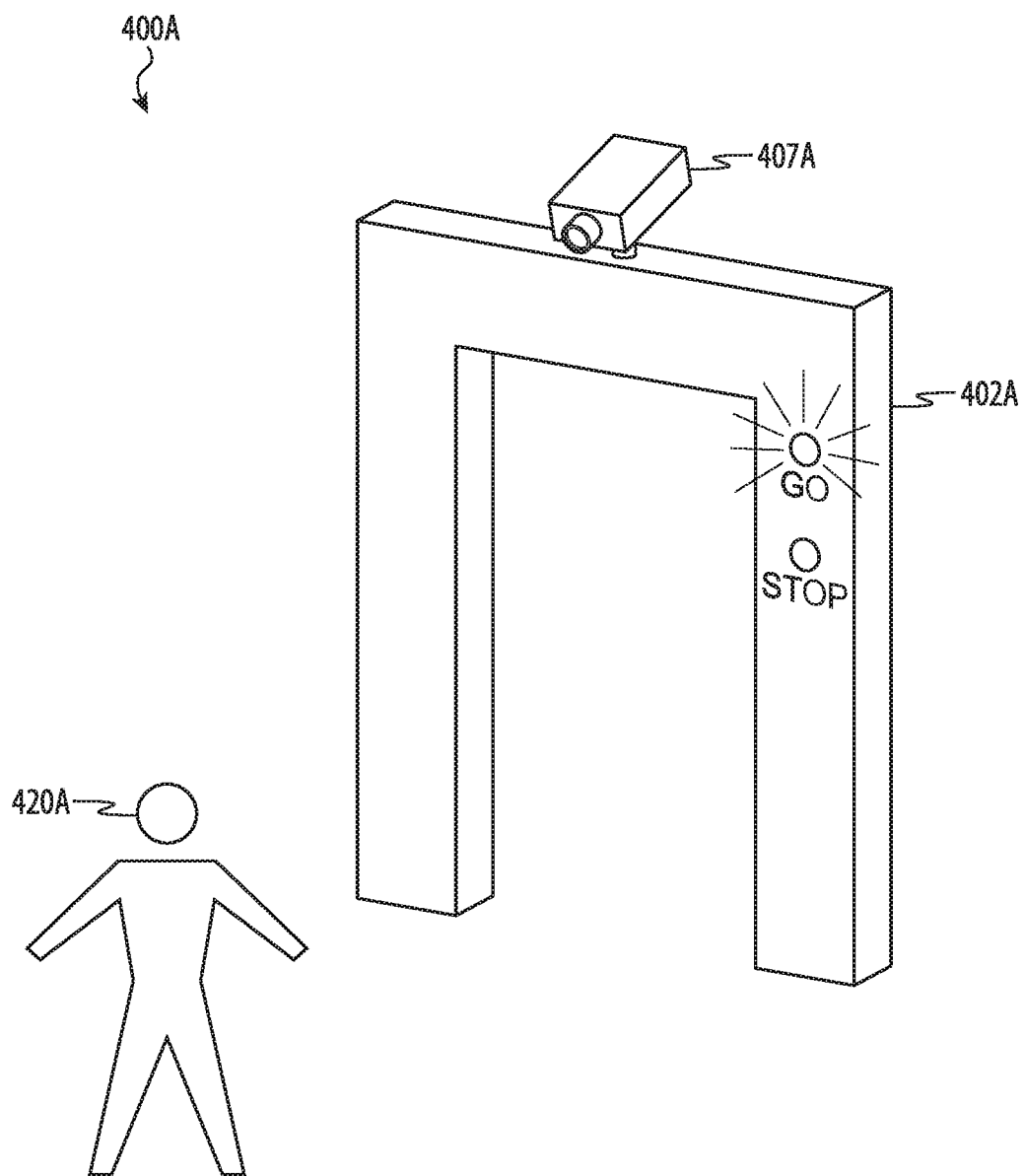
FIG. 4A depicts a second example system for enhancing capabilities by cooperatively using identity systems and identification databases.

FIG. 4A depicts a second example system 400A for enhancing capabilities by cooperatively using identity systems and identification databases. In this example, a station 402A may be an automated airport security screening gate. The automated airport security screening gate may use a camera 407A to obtain one or more digital representations of one or more biometrics for a person 420A, such as one or more facial images, retina images, iris images, and so on. The automated airport security screening gate may be operable to transmit such digital representations of such biometrics to one or more identification databases and/or identity systems to identify the person 420A and determine whether or not the person 420A should be allowed to proceed through the automated airport security screening gate (which may include scanning components for sensing whether or not the person 420A has various metals, explosives, and/or other contraband).

For example, the automated airport security screening gate may identify the person 420A by submitting a facial image to an identification database and an iris image obtained after identifying a face in the facial image to an identity system. These two identifications may have significantly higher fidelity than an identification only using the facial image with the identification database. Various configurations are possible and contemplated without departing from the scope of the present disclosure.

By way of another example, the automated airport security screening gate may use the identification database to identify the person 420A and then access identity information stored by the identity system to perform one or more actions related to identifying the person 420A. For example, airline employees may be summoned to the gate based on the approach of the person 420A. By way of another example, a reservation may be made at an airport lounge associated with a loyalty account identified in the identity data for the person 420A. Various configurations are possible and contemplated without departing from the scope of the present disclosure.

Figure 4B:
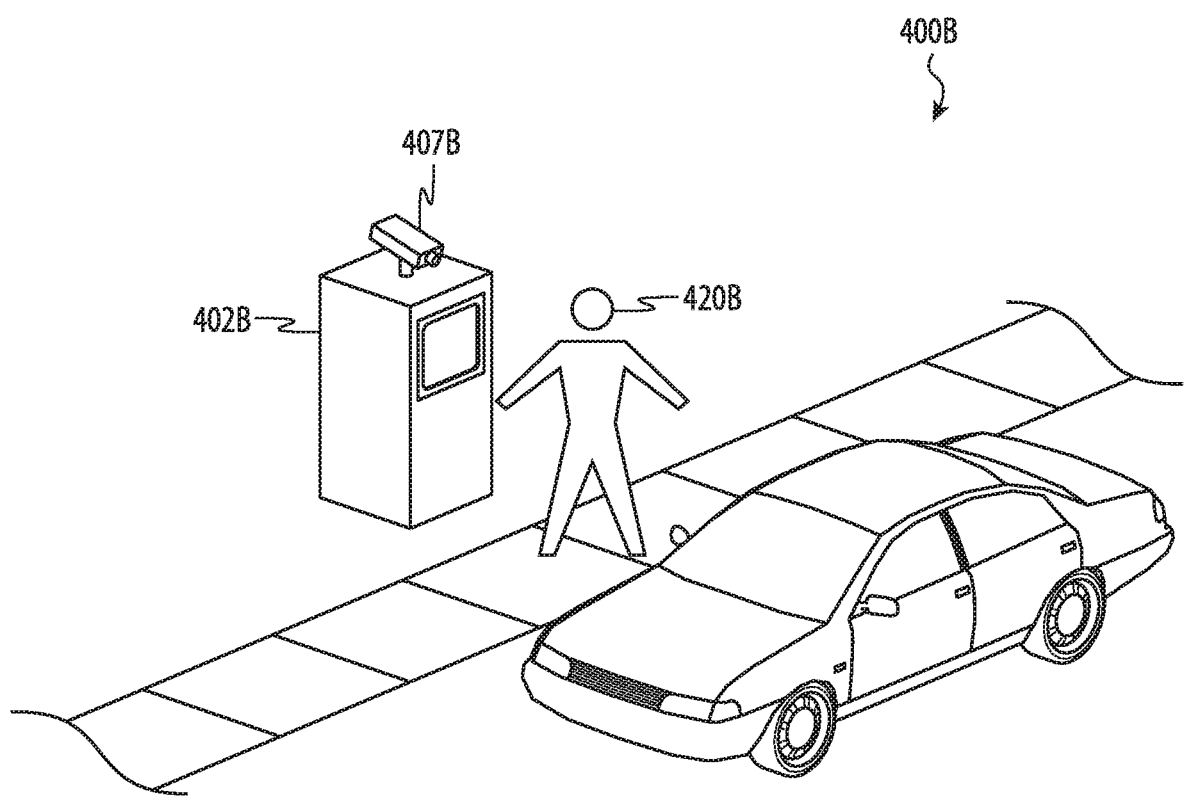
FIG. 4B depicts a third example system for enhancing capabilities by cooperatively using identity systems and identification databases.

FIG. 4B depicts a third example system 400B for enhancing capabilities by cooperatively using identity systems and identification databases. In this example, a station 402B may be a monitoring station at an arrival area of an airport. The monitoring station may use a camera 407B to obtain one or more digital representations of one or more biometrics for a person 420B, identify the person 420B using the digital representation of the biometric with an identification database, and access identity information stored by an identity system to perform one or more actions related to the arrival of the person 420B at the airport.

For example, information may be transmitted to security screening personnel according to traffic estimations evaluated including the person 420B and/or other persons and/or where such people are estimated to travel. This may enable real time shifting of personnel and/or other resources according to changing traffic patterns. Various configurations are possible and contemplated without departing from the scope of the present disclosure.

Figure 4C:
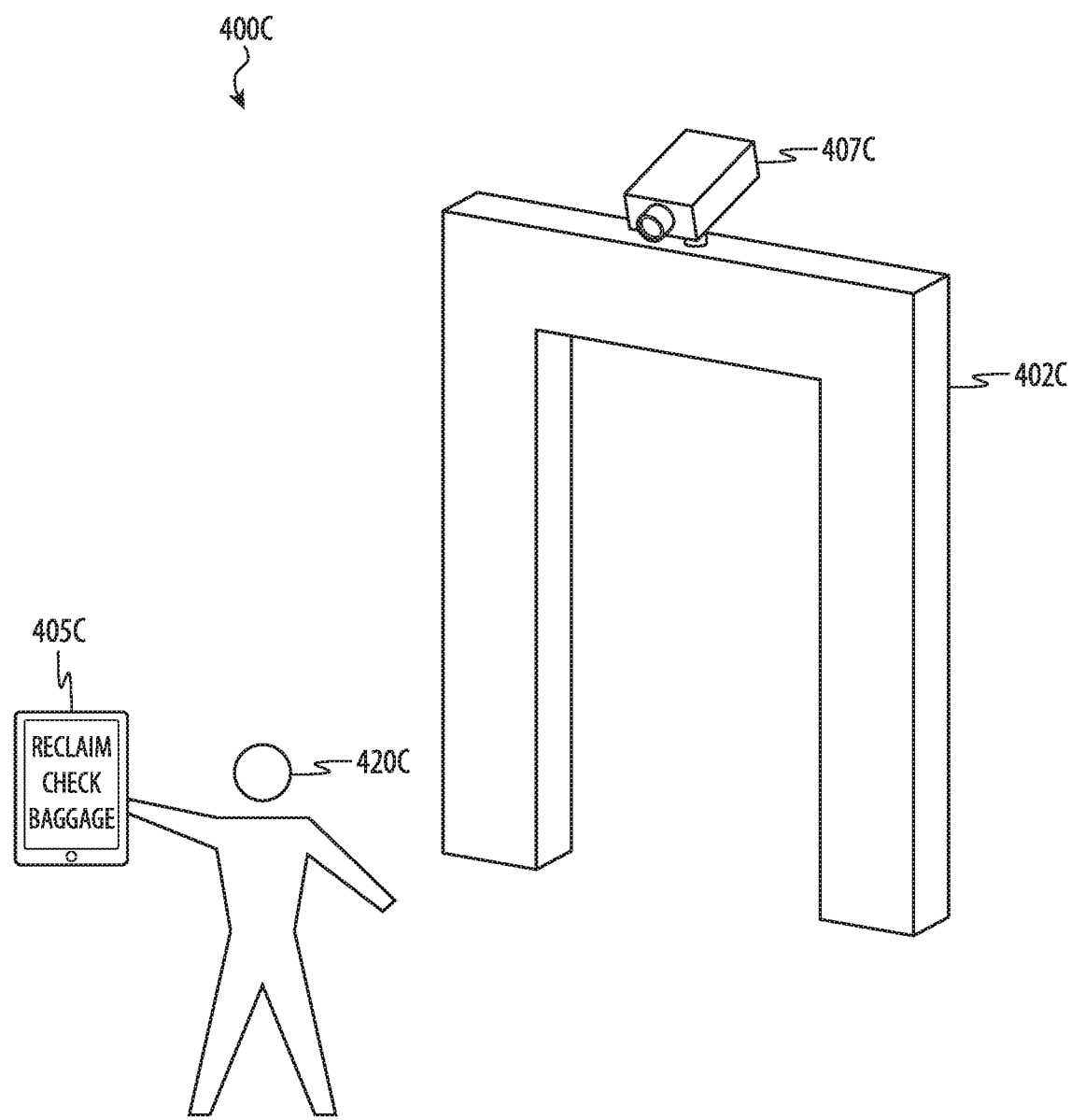
FIG. 4C depicts a fourth example system for enhancing capabilities by cooperatively using identity systems and identification databases.

FIG. 4C depicts a fourth example system 400C for enhancing capabilities by cooperatively using identity systems and identification databases. In this example, a station 402C may be an automated airport security screening gate. The automated airport security screening gate may use a camera 407C to obtain one or more digital representations of one or more biometrics for a person 420C, identify the person 420C, and access identity information for the person 420C to determine an associated electronic device 405C to which messages may be transmitted to the person 420C.

For example, the person 420C may check baggage that includes external lithium ion batteries that may be carried on a plane but not checked in check baggage. An airline may find such an item in checked baggage and attempt to contact the person 420C to come and reclaim the check baggage and/or the item so that the check baggage may remain checked. When the person 420C is identified, the identity information may be accessed to determine information that can be used to send messages to the electronic device 405C and that the airline has a message for the person 420C. The message may then be sent. Various configurations are possible and contemplated without departing from the scope of the present disclosure.

By way of another example, various information may be sent to the electronic device 405C upon identification of the person 420C. For example, a message may be sent that the person 420C is entering the wrong terminal based on flight information indicated in the identity data. By way of another example, directions, terminal maps, flight information or updates, and/or other information may be transmitted to the electronic device 405C upon identification of the person 420C. Various configurations are possible and contemplated without departing from the scope of the present disclosure.

Figure 4D:
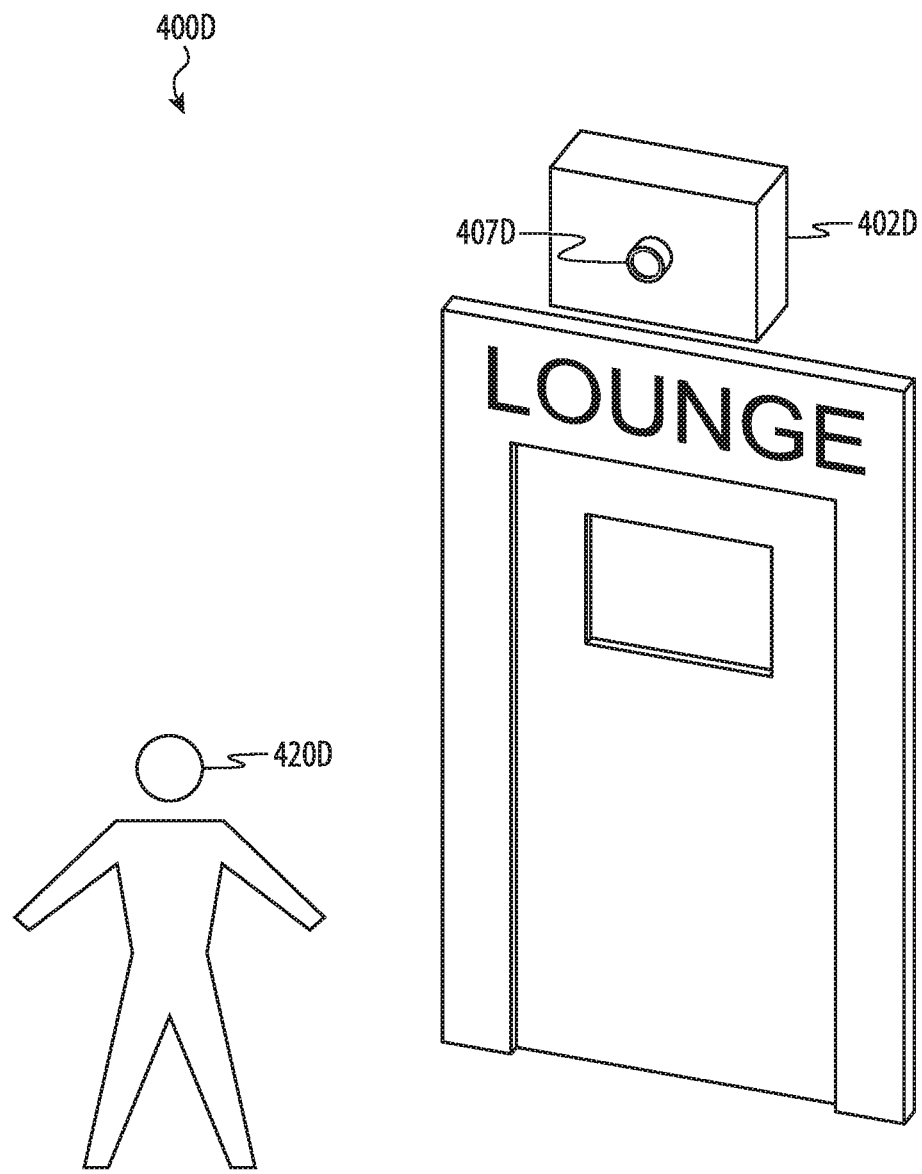
FIG. 4D depicts a fifth example system for enhancing capabilities by cooperatively using identity systems and identification databases.

FIG. 4D depicts a fifth example system 400D for enhancing capabilities by cooperatively using identity systems and identification databases. In this example, a station 402D may be an airport lounge access control device for an international traveler airport lounge. The airport lounge access control device may use a camera 407D to obtain an image of a person 420D, identify the person 420D, and access identity information to determine whether or not the person 420D is currently traveling to an international destination.

If so, the airport lounge access control device may allow the person 420D into the international traveler airport lounge. Otherwise, the airport lounge access control device may transmit a message to an electronic device associated with the person 420D to direct the person 420D to an airport lounge that the person 420D is entitled to enter. Various configurations are possible and contemplated without departing from the scope of the present disclosure.

Figure 4E:
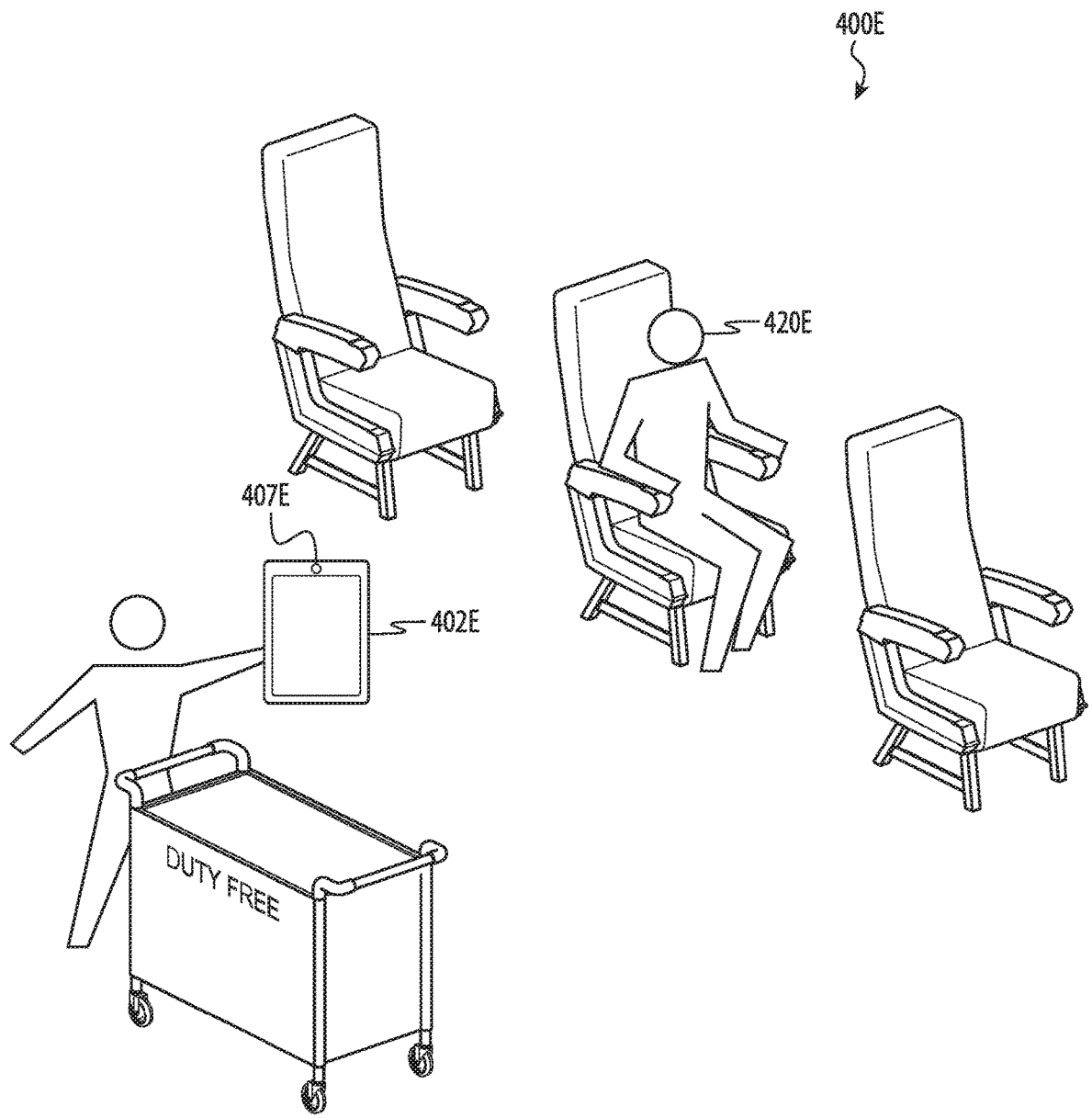
FIG. 4E depicts a sixth example system for enhancing capabilities by cooperatively using identity systems and identification databases.

FIG. 4E depicts a sixth example system 400E for enhancing capabilities by cooperatively using identity systems and identification databases. In this example, a station 402E may be a mobile point of sale electronic device operable by a flight attendant to sell duty free goods on a flight. Such duty free goods may only be sold to international travelers. The flight attendant may use a camera 407E the mobile point of sale electronic device to capture one or more images of a person 420E in order to identify the person 420E and access identity information to determine if the person 420E is an international traveler and thus able to purchase duty free goods. If so, the flight attendant may use the mobile point of sale electronic device to process a payment for such duty free goods using payment information stored in the identity information.

In various implementations, the duty free goods may be an age-restricted product. For example, the duty free goods may be an alcoholic beverage that may be restricted under appropriate law to purchase by people at least 18 years of age, 21 years of age, and so on. In such a situation, the mobile point of sale electronic device may determine the appropriate law and use the identity information to verify whether or not such appropriate law allows the person 420E to purchase. The mobile point of sale electronic device may then approve or deny the sale accordingly.

However, in some implementations, if the mobile point of sale electronic device determines that the person 420E is not an international traveler, the mobile point of sale electronic device may be configured to still sell the duty free goods to the person 420E. In such a situation, the mobile point of sale electronic device may be configured to remove the duty free status of the goods automatically and charge appropriate taxes without requiring any intervention by the flight attendant or the person 420E. Various configurations are possible and contemplated without departing from the scope of the present disclosure.

Figure 5:
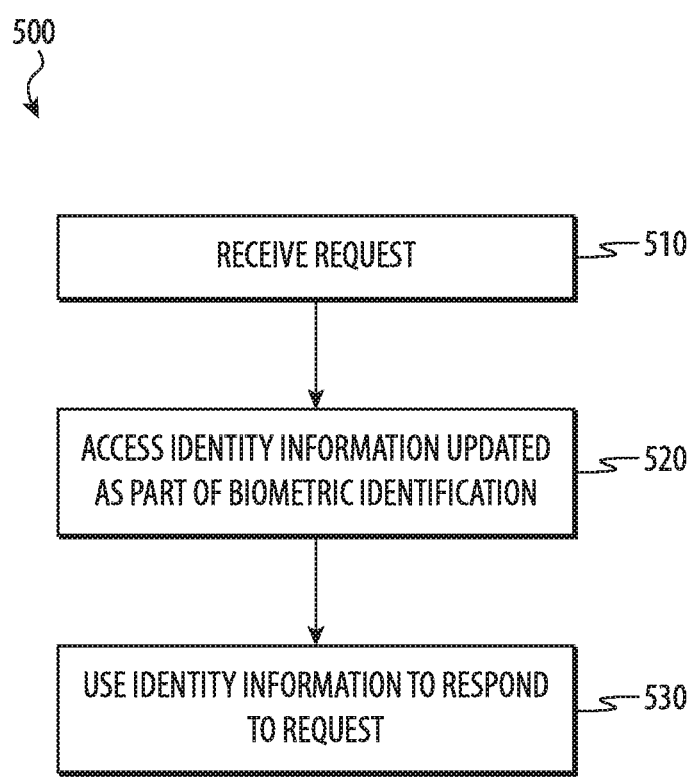
FIG. 5 depicts a flow chart illustrating a third example method for enhancing capabilities by cooperatively using identity systems and identification databases. This method may be performed by the systems of FIGS. 1 and/or 4A-4E.

FIG. 5 depicts a flow chart illustrating a third example method 500 for enhancing capabilities by cooperatively using identity systems and identification databases. This method 500 may be performed by the systems 100, 400A-400E of FIGS. 1 and/or 4A-4E.

At operation 510, an electronic device, such as the identity system electronic device 101 of FIG. 1 and/or the stations 102, 402A-402E of FIGS. 1 and/or 4A-4E, may receive a request related to stored identity information. At operation 520, the electronic device may access identity information that has been updated as part of performing one or more biometric identifications. At operation 530, the electronic device may use the identity information to respond to the request.

For example, the biometric identifications may be performed as part of arriving at an airport and/or security screening and/or passing one or more airport checkpoints. An airline may query to determine all passengers on a certain flight who have been identified in order to determine who may be present in a gate area. The electronic device may receive the request, access the identity information, and respond accordingly. Various configurations are possible and contemplated without departing from the scope of the present disclosure.

In various examples, this example method 500 may be implemented as a group of interrelated software modules or components that perform various functions discussed herein. These software modules or components may be executed within a cloud network and/or by one or more computing devices, such as the identity system electronic device 101 of FIG. 1 and/or the stations 102, 402A-402E of FIGS. 1 and/or 4A-4E.

Although the example method 500 is illustrated and described as including particular operations performed in a particular order, it is understood that this is an example. In various implementations, various orders of the same, similar, and/or different operations may be performed without departing from the scope of the present disclosure.

For example, in some implementations, the method 500 may include the further operation of determining whether or not the requestor is authorized to access the requested information. If so, the electronic device may provide the requested information. Otherwise, the electronic device may omit providing the requested information. Various configurations are possible and contemplated without departing from the scope of the present disclosure.

Figure 6:
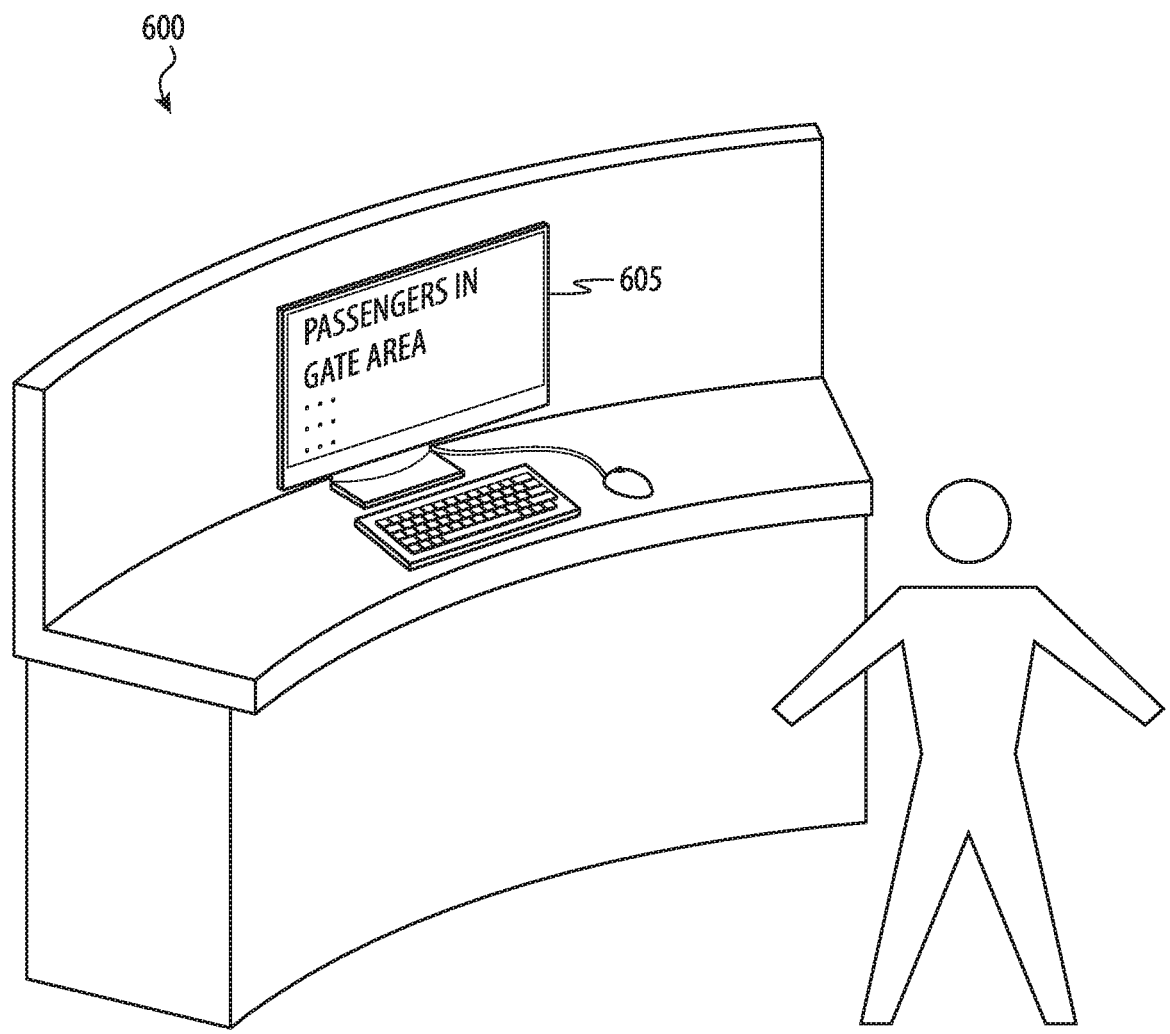
FIG. 6 depicts a seventh example system for enhancing capabilities by cooperatively using identity systems and identification databases.

FIG. 6 depicts a seventh example system 600 for enhancing capabilities by cooperatively using identity systems and identification databases. In this example, an other computing device 605 may be an airline computing terminal, such as an airline computing terminal at a gate, ticketing counter, and so on. An airline employee may use the computing device to query an identity system related to various stored identity information and receive one or more responses thereto.

For example, the airline employee may use the computing device 605 to query for all passengers on a specific flight who have been identified at a security screening in order to determine which passengers might or might not be in a gate area. In another example, the airline employee may use the computing device 605 to query for all passengers on a specific flight who might be interested in a seat upgrade. In such an example, the query may include contacting the person using an associated electronic device and/or obtaining information regarding such so that the airline employee may contact the person directly. In still another example, the airline employee may use the computing device 605 to query for all passengers on a specific flight who have not been identified at a security screening checkpoint so that associated luggage for a flight may be removed from an aircraft and/or other flight arrangements may be made if the people will not make the flight.

Figure 7:
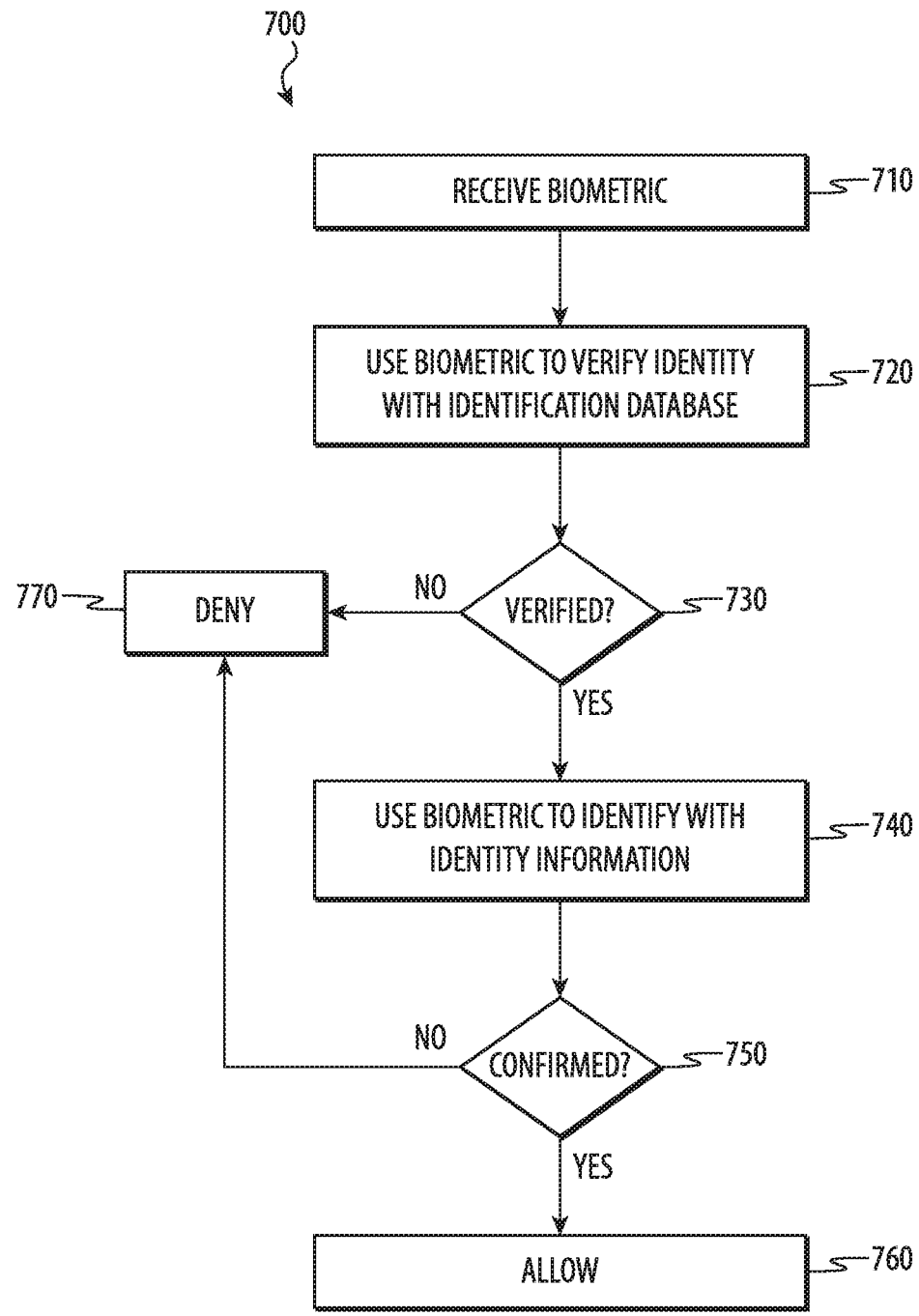
FIG. 7 depicts a flow chart illustrating a fourth example method for enhancing capabilities by cooperatively using identity systems and identification databases. This method may be performed by the systems of FIGS. 1, 4A-4E, and/or 6.

FIG. 7 depicts a flow chart illustrating a fourth example method 700 for enhancing capabilities by cooperatively using identity systems and identification databases. This method 700 may be performed by the systems 100, 400A-400E, and/or 600 of FIGS. 1, 4A-4E, and/or 6.

At operation 710, an electronic device (such as the identity system electronic device 101 of FIG. 1, the stations 102, 402A-402E of FIGS. 1 and/or 4A-4E, and/or the other computing device 605 of FIG. 6) may receive a digital representation of a biometric. At operation 720, the electronic device may use the digital representation of the biometric to verify and/or otherwise establish an identity of a person with an identification database. At operation 730, the electronic device may determine whether or not identity is verified. If not, the flow may proceed to operation 770 where the electronic device may deny the person. Otherwise, the flow may proceed to operation 740.

At operation 740, the electronic device may use the use the digital representation of the biometric to verify and/or otherwise establish an identity of a person with an identity system. At operation 750, the electronic device may determine whether or not the identity system could be used to confirm the identity that was verified using the identification system. If so, the flow may proceed to operation 760 where the electronic device may allow the person. Otherwise, the flow may proceed to operation 770 where the electronic device may deny the person.

For example, in some implementations, verifying and/or otherwise establishing the identity of the person with both the identification database and the identity system may increase the fidelity of the identification. In other examples, verifying and/or otherwise establishing the identity of the person with the identity system as well as the identification database may enable access to identity information stored by the identity system. In still other examples, the electronic device may first determine whether or not the identification database can be used to verify and/or otherwise establish the identity of the person before searching the identity system in order to reduce the number of unsuccessful searches that may be performed using the identity system. Various configurations are possible and contemplated without departing from the scope of the present disclosure.

In various examples, this example method 700 may be implemented as a group of interrelated software modules or components that perform various functions discussed herein. These software modules or components may be executed within a cloud network and/or by one or more computing devices, such as the identity system electronic device 101 of FIG. 1, the stations 102, 402A-402E of FIGS. 1 and/or 4A-4E, and/or the other computing device 605 of FIG. 6.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 is illustrated and described as denying the person if the identity cannot be verified and/or otherwise established with the identification database. However, in other examples, the person may only be denied if the identity cannot be verified and/or otherwise established with either the identification database or the identity system. In such an example, the person may be approved if the identity can be verified and/or otherwise established with one of the identification database or the identity system. Various configurations are possible and contemplated without departing from the scope of the present disclosure.

By way of another example, the method 700 illustrates and describes attempting to verify and/or establish the identity with the identification database and then the identity system. However, it is understood that this is an example. In various implementations, this order may be reversed. For example, the electronic device may verify and/or establish the identity with the identification database only if the electronic device successfully verifies and/or establishes the identity stored by the identity system in order to reduce the number of unsuccessful searches performed using the identification database. Various configurations are possible and contemplated without departing from the scope of the present disclosure.

Figure 8:
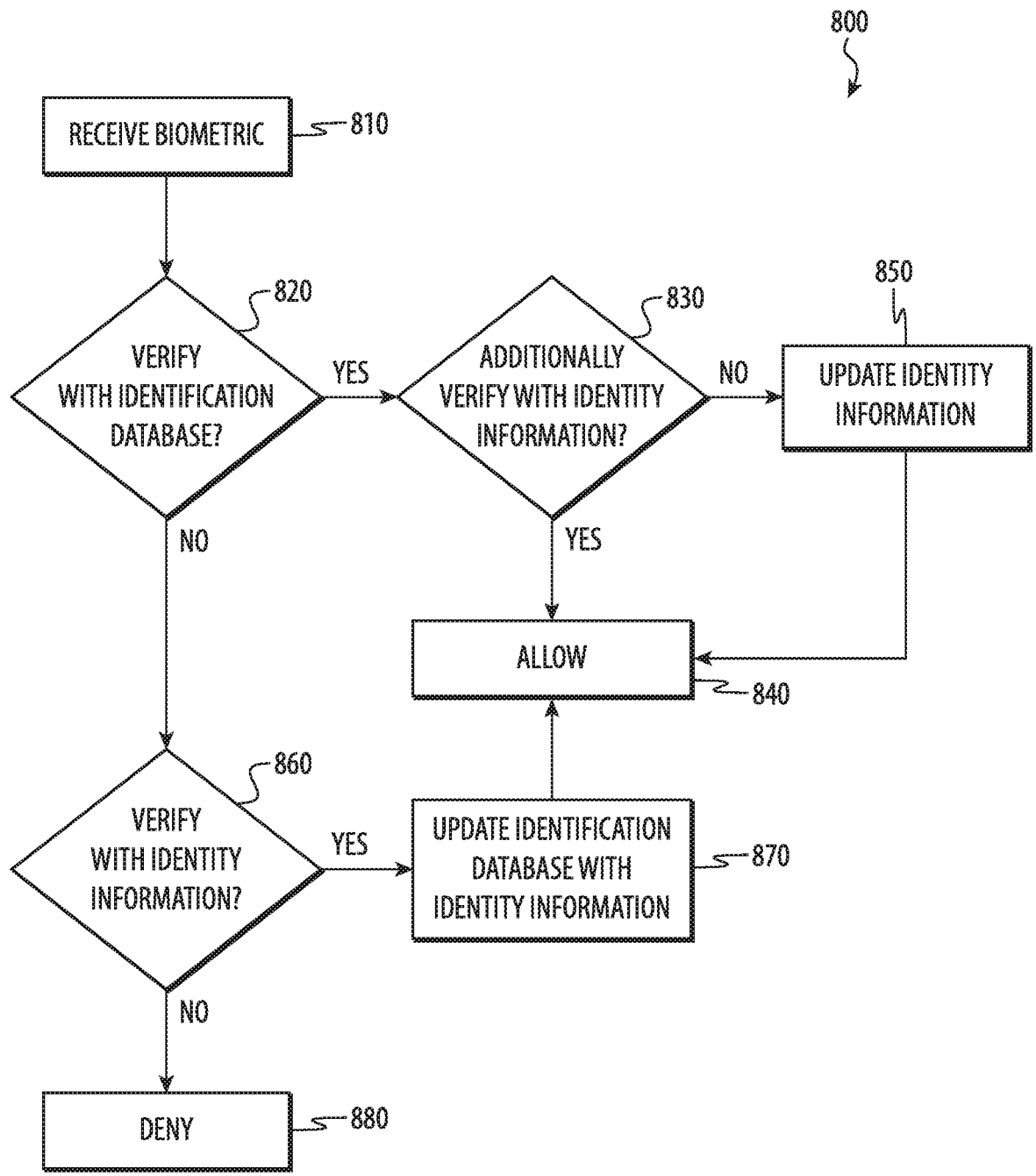
FIG. 8 depicts a flow chart illustrating a fifth example method for enhancing capabilities by cooperatively using identity systems and identification databases. This method may be performed by the systems of FIGS. 1, 4A-4E, and/or 6.

FIG. 8 depicts a flow chart illustrating a fifth example method 800 for enhancing capabilities by cooperatively using identity systems and identification databases. This method 800 may be performed by the systems 100, 400A-400E, and/or 600 of FIGS. 1, 4A-4E, and/or 6.

At operation 810, an electronic device (such as the identity system electronic device 101 of FIG. 1, the stations 102, 402A-402E of FIGS. 1 and/or 4A-4E, and/or the other computing device 605 of FIG. 6) may receive a digital representation of a biometric. At operation 820, the electronic device may determine whether or not the electronic device is able to use the digital representation of the biometric to verify and/or otherwise establish an identity of a person with an identification database. If so, the flow may proceed to operation 830. Otherwise, the flow may proceed to operation 860.

At operation 830, the electronic device may determine whether or not the electronic device is able to use the digital representation of the biometric to additionally verify and/or otherwise establish the identity with the identity information stored by the identity system. If so, the flow may proceed to operation 840 where the electronic device may allow the person. Otherwise, the flow may proceed to operation 850 where the electronic device may update the identity information (such as with the digital representation of the biometric, information from the identification information, and so on) before the flow may proceed to operation 840 and the electronic device may allow the person.

At operation 860, the electronic device may determine whether or not the electronic device is able to use the digital representation of the biometric to verify and/or otherwise establish the identity with the identity information stored by the identity system. If not, the flow may proceed to operation 880 where the electronic device may deny the person. Otherwise, the flow may proceed to operation 870 where the electronic device may update the identification database using the identity information (such as with the digital representation of the biometric, information from the identity information, and so on) before the flow may proceed to operation 840 and the electronic device may allow the person.

In various examples, this example method 800 may be implemented as a group of interrelated software modules or components that perform various functions discussed herein. These software modules or components may be executed within a cloud network and/or by one or more computing devices, such as the identity system electronic device 101 of FIG. 1, the stations 102, 402A-402E of FIGS. 1 and/or 4A-4E, and/or the other computing device 605 of FIG. 6.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 illustrates and describes attempting to verify and/or establish the identity with the identification database and then the identity system. However, it is understood that this is an example. In various implementations, this order may be reversed. Various configurations are possible and contemplated without departing from the scope of the present disclosure.

By way of another example, the method 800 illustrates and describes updating the identification database when the electronic device is unable to use the identification database to verify and/or establish the identity and updating the identity information when the electronic device is unable to use the identity information to verify and/or establish the identity and updating the identity information. However, in some implementations, the electronic device may omit updating one or more of the identification database and/or the identification information. Various configurations are possible and contemplated without departing from the scope of the present disclosure.

In some implementations, a system for enhancing capabilities by cooperatively using identity systems and identification databases may include at least one non-transitory storage medium that stores instructions and at least one processor. The at least one processor may execute the instructions to obtain at least one digital representation of a biometric for a person, attempt to verify an identity for the person with an identification database using the at least one digital representation of the biometric, attempt to verify the identity for the person with an identity system using the at least one digital representation of the biometric, and perform an action if the identity for the person is verified.

In various examples, the at least one processor may perform a first verification by verifying the identity for the person with the identification database and increase a fidelity of the first verification by performing a second verification through verifying the identity for the person with the identity system. In some such examples, the at least one digital representation of the biometric may be a first digital representation of a first biometric and a second digital representation of a second biometric, the first verification may use the first digital representation of the first biometric, and the second verification may use the second digital representation of the second biometric.

In a number of examples, the at least one processor may use information from the identification database to update the identity system when the at least one processor is able to verify the identity for the person with the identification database but is unable to verify the identity for the person with the identity system. In other examples, the at least one processor may use information from the identity system to update the identification database when the at least one processor is able to verify the identity for the person with the identity system but is unable to verify the identity for the person with the identification database. In various examples, first biometric data stored in the identification database may be of a lower quality than second biometric data stored by the identity system.

Figure 9:
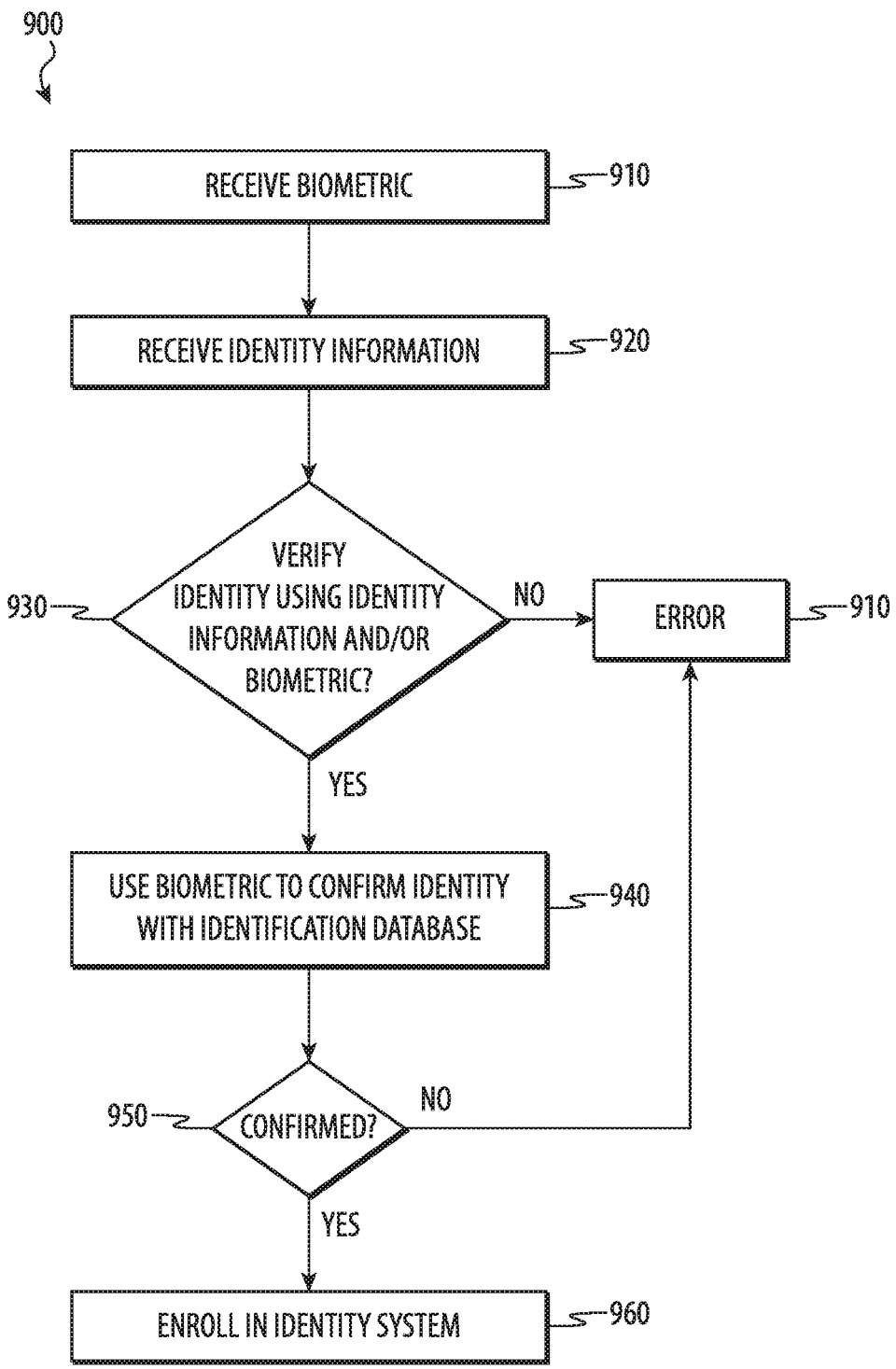
FIG. 9 depicts a flow chart illustrating a sixth example method for enhancing capabilities by cooperatively using identity systems and identification databases. This method may be performed by the systems of FIGS. 1, 4A-4E, and/or 6.

FIG. 9 depicts a flow chart illustrating a sixth example method 900 for enhancing capabilities by cooperatively using identity systems and identification databases. This method 900 may be performed by the systems 100, 400A-400E, and/or 600 of FIGS. 1, 4A-4E, and/or 6.

At operation 910, an electronic device (such as the identity system electronic device 101 of FIG. 1, the stations 102, 402A-402E of FIGS. 1 and/or 4A-4E, and/or the other computing device 605 of FIG. 6) may receive one or more digital representations of one or more biometrics from a person. At operation 920, the electronic device may receive identity information and/or data related thereto. For example, this may include, but is not limited to, one or more names, addresses, telephone numbers, notification preferences and/or other notification information, social security numbers, frequent flyer numbers, financial data, financial account numbers, verified ages, boarding pass data, flight data, movement data, historic movement data, identification token scans, and so on.

At operation 930, the electronic device may determine whether or not the electronic device is able to verify and/or otherwise authenticate and/or establish the identity of the person using the identity information and/or the digital representation of the biometric. For example, this may include verifying the liveness of the biometric, verifying that the person has a valid identification token, verifying that the person is not on a no fly list and/or other law enforcement warning database, determining the likelihood that a person is who the person asserts to be using accessible public records, knowledge-based authentication questions, and so on. If not, the flow may proceed to operation 970 where the electronic device may output an error. Otherwise, the flow may proceed to operation 940.

At operation 940, after the electronic device determines that the electronic device is able to verify and/or otherwise authenticate and/or establish the identity of the person using the identity information and/or the digital representation of the biometric, the electronic device may use the digital representation of the biometric to confirm the identity with an identity database. The flow may then proceed to operation 950 where the electronic device determines whether or not the electronic device was able to confirm the identity with the identity database. If not, the flow may proceed to operation 970 where the electronic device may output an error. Otherwise, the flow may proceed to operation 960.

At operation 960, the electronic device may enroll the person in an identity system. Enrolling the person in the identity system may include storing the digital representation of the biometric, other digital representations of other biometrics, the identity information and/or data related thereto, information related to the identification database and/or whether or not the electronic device was able to confirm the identity with the identity database, and so on.

In various examples, this example method 900 may be implemented as a group of interrelated software modules or components that perform various functions discussed herein. These software modules or components may be executed within a cloud network and/or by one or more computing devices, such as the identity system electronic device 101 of FIG. 1, the stations 102, 402A-402E of FIGS. 1 and/or 4A-4E, and/or the other computing device 605 of FIG. 6.

Although the example method 900 is illustrated and described as including particular operations performed in a particular order, it is understood that this is an example. In various implementations, various orders of the same, similar, and/or different operations may be performed without departing from the scope of the present disclosure.

For example, the method 900 is illustrated and described as outputting an error if the electronic device was unable to confirm the identity with the identity database. However in various implementations, the electronic device may instead perform other identity confirmations if the electronic device is unable to confirm the identity with the identity database. For example, the electronic device may not require verification of a driver's license, passport, and/or other identity token if the electronic device is able to confirm the identity with the identity database but may attempt to verify a driver's license, passport, and/or other identity token if the electronic device is unable to confirm the identity with the identity database. Various configurations are possible and contemplated without departing from the scope of the present disclosure.

In a number of embodiments, a system for enhancing capabilities by cooperatively using identity systems and identification databases may include at least one non-transitory storage medium that stores instructions and at least one processor. The at least one processor may execute the instructions to obtain at least one digital representation of a biometric for a person; obtain identity information for the person; use at least one of the identity information or the at least one digital representation of the biometric to verify an identity for the person; and upon confirming the identity for the person with an identification database using the at least one digital representation of the biometric, enroll the person in an identity system.

In some examples, the at least one processor may enroll the person in the identification system upon verification of an identification token when the identity for the person cannot be confirmed with the identification database. In various examples, the at least one processor may store data regarding at least one of the at least one digital representation of the biometric or the identity information as part of enrolling the person in the identity system. In a number of examples, the at least one processor may be operative to use the identity system to biometrically identify the person after enrolling the person in the identity system.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to enhancing capabilities by cooperatively using identity systems and identification databases. In some examples, a system uses a digital representation of a biometric to verify an identity for a person with an identification database, accesses identity information for the person in an identity system using the digital representation of the biometric, and performs an action using the identity information. In various examples, a system attempts to verify an identity for a person with an identification database using a digital representation of a biometric, attempts to verify the identity for the person with an identity system using the digital representation of the biometric, and performs an action if the identity for the person is verified. In a number of examples, a system obtains a digital representation of a biometric and identity information for a person; uses at least one of the identity information or the digital representation of the biometric to verify an identity for the person; and, upon confirming the identity with an identification database using the digital representation of the biometric, enrolls the person in an identity system.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for enhancing capabilities by cooperatively using identity systems and identification databases, comprising:
    at least one non-transitory storage medium that stores instructions; and
    at least one processor that executes the instructions to:
        obtain at least one digital representation of a biometric for a person;
        use the at least one digital representation of the biometric to verify an identity for the person with an identification database;
        access identity information for the person in an identity system using the at least one digital representation of the biometric, the identification database being separate from the identity system and the identity information being inaccessible from the identification database; and
        perform an action using the identity information;
    wherein:
    the identification database is separate from the identity system; and
    the identity information is inaccessible via the identification database.

2. The system of claim 1, wherein the action includes estimating a path for the person using the identity information.

3. The system of claim 1, wherein the action includes transmitting a communication to the person using the identity information.

4. The system of claim 1, wherein the action includes transmitting a notification regarding the person to a computing device using the identity information.

5. The system of claim 1, wherein the action includes:
    receiving a query regarding the identity information; and
    responding to the query.

6. The system of claim 1, wherein the action includes using the identity information to reduce a gallery size for a subsequent identification.

7. The system of claim 1, wherein the action includes updating the identity information based on a response from the identification database.

8. The system of claim 1, wherein the action includes updating the identity information based on receipt of the at least one digital representation of the biometric.

9. The system of claim 1, wherein the action includes processing a payment.

10. The system of claim 1, wherein the identity information is not stored in the identification database.

11. A system for enhancing capabilities by cooperatively using identity systems and identification databases, comprising:
    at least one non-transitory storage medium that stores instructions; and
    at least one processor that executes the instructions to:
        obtain at least one digital representation of a biometric for a person;
        attempt to verify an identity for the person with an identification database using the at least one digital representation of the biometric;
        attempt to verify the identity for the person with an identity system using the at least one digital representation of the biometric; and
        perform an action if the identity for the person is verified wherein:
    the identification database is separate from the identity system; and
    the identification database lacks identity information for the person that is available from the identity system.

12. The system of claim 11, wherein the at least one processor:
    performs a first verification by verifying the identity for the person with the identification database; and
    increases a fidelity of the first verification by performing a second verification through verifying the identity for the person with the identity system.

13. The system of claim 12, wherein:
    the at least one digital representation of the biometric comprises a first digital representation of a first biometric and a second digital representation of a second biometric;

the first verification uses the first digital representation of the first biometric; and the second verification uses the second digital representation of the second biometric.

14. The system of claim 11, wherein the at least one processor uses information from the identification database to update the identity system when the at least one processor is able to verify the identity for the person with the identification database but is unable to verify the identity for the person with the identity system.

15. The system of claim 11, wherein the at least one processor uses information from the identity system to update the identification database when the at least one processor is able to verify the identity for the person with the identity system but is unable to verify the identity for the person with the identification database.

16. The system of claim 11, wherein first biometric data stored in the identification database is of a lower quality than second biometric data stored by the identity system.

17. A system for enhancing capabilities by cooperatively using identity systems and identification databases, comprising:

at least one non-transitory storage medium that stores instructions; and at least one processor that executes the instructions to:

obtain at least one digital representation of a biometric for a person;

obtain identity information for the person;

use at least one of the identity information or the at least one digital representation of the biometric to verify an identity for the person; and upon confirming the identity for the person with an identification database using the at least one digital representation of the biometric, enroll the person in an identity system; wherein:

the identification database is separate from the identity system; and the identity information is accessible from the identity system but not the identification database.

18. The system of claim 17, wherein the at least one processor enrolls the person in the identification system upon verification of an identification token when the identity for the person cannot be confirmed with the identification database.

19. The system of claim 17, wherein the at least one processor stores data regarding at least one of the at least one digital representation of the biometric or the identity information as part of enrolling the person in the identity system.

20. The system of claim 17, wherein the at least one processor is operative to use the identity system to biometrically identify the person after enrolling the person in the identity system.

* * * * *